United States Patent [19]

Okada et al.

[11] Patent Number: 5,777,028

[45] Date of Patent: *Jul. 7, 1998

[54] IMPACT MODIFIED SYNDIOTACTIC POLYSTYRENE BLEND

[75] Inventors: Akihiko Okada, Ichihara; Nobuyuki Sato, Tokyo, both of Japan

[73] Assignee: Idemitsu Kosan Co., Ltd., Tokyo, Japan

[*] Notice: The term of this patent shall not extend beyond the expiration date of Pat. No. 5,543,462.

[21] Appl. No.: 648,017

[22] PCT Filed: Oct. 4, 1995

[86] PCT No.: PCT/JP95/02029

§ 371 Date: May 31, 1996

§ 102(e) Date: May 31, 1996

[87] PCT Pub. No.: WO96/11233

PCT Pub. Date: Apr. 18, 1996

[30] Foreign Application Priority Data

Oct. 5, 1994 [JP] Japan .................. 6-240972

[51] Int. Cl.⁶ .......................... C08L 25/06; C08L 53/02; C08L 9/00; C08L 23/16
[52] U.S. Cl. .......................... 525/86; 525/68; 525/71; 525/93; 525/98; 525/132
[58] Field of Search ........................ 525/86, 68, 93, 525/98, 132, 71

[56] References Cited

U.S. PATENT DOCUMENTS

| | | |
|---|---|---|
| 4,386,187 | 5/1983 | Grancio et al. . |
| 4,713,416 | 12/1987 | Del Giudice et al. . |
| 4,716,199 | 12/1987 | VanderMeer . |
| 5,089,353 | 2/1992 | Negi et al. . |
| 5,109,068 | 4/1992 | Yamasaki et al. . |
| 5,127,158 | 7/1992 | Nakano . |
| 5,166,238 | 11/1992 | Nakano et al. . |
| 5,200,454 | 4/1993 | Nakano . |
| 5,219,940 | 6/1993 | Nakano . |
| 5,270,353 | 12/1993 | Nakano et al. . |
| 5,326,813 | 7/1994 | Okada et al. . |
| 5,346,950 | 9/1994 | Negi et al. . |
| 5,352,727 | 10/1994 | Okada . |
| 5,391,603 | 2/1995 | Wessel et al. . |
| 5,391,611 | 2/1995 | Funayama et al. . |
| 5,412,024 | 5/1995 | Okada et al. . |
| 5,418,275 | 5/1995 | Okada et al. . |
| 5,436,397 | 7/1995 | Okada . |
| 5,444,126 | 8/1995 | Okada et al. . |
| 5,543,462 | 8/1996 | Okada et al. . |

FOREIGN PATENT DOCUMENTS

| | | |
|---|---|---|
| 0 318 793 | 6/1989 | European Pat. Off. . |
| 0 324 398 | 7/1989 | European Pat. Off. . |
| 06116454 | 4/1994 | Japan . |
| 94-20571 | 9/1994 | WIPO . |

*Primary Examiner*—Donald R. Wilson
*Attorney, Agent, or Firm*—Oblon, Spivak, McClelland, Maier & Neustadt, P.C.

[57] ABSTRACT

The present invention relates to an impact resistant polystyrene composition which comprises 5 to 97% by weight of an (a) styrenic polymer having syndiotactic configuration, 2 to 95% by weight of a (b) rubbery elastomer having an olefinic component or a polyolefin, and 0.5 to 10% by weight of a (c) styrene/olefin block or graft copolymer having a microphase separation temperature of 180° C. at the highest when diluted with dioctyl phthalate to a solution with a concentration of 60% by weight; according to the present invention, an impact resistant polystyrene composition can be provided which is greatly enhanced in impact resistance and extensibility without impairing heat resistance and modulus of elasticity.

3 Claims, No Drawings

IMPACT MODIFIED SYNDIOTACTIC POLYSTYRENE BLEND

TECHNICAL FIELD

The present invention relates to an impact resistant polystyrene composition. More particularly, it pertains to a syndiotactic polystyrene composition which is excellent not only in heat resistance and modulus of elasticity but also in impact resistance and extensibility.

BACKGROUND ART

A styrenic polymer having syndiotactic configuration (hereinafter sometimes abbreviated as SPS) is excellent in heat resistance and chemical resistance but is poor in impact resistance and therefore, it has heretofore been limited in the scope of application usable as a construction material. In order to solve the problem, improvement have been made on the impact resistance of SPS, for example, by blending a rubbery elastomer and/or other thermoplastic resin with SPS. (Refer to Japanese Patent Application Laid-Open Nos. 257950/1987, 146944/1989, 182344/1989, 279944/1989 and 64140/1990.)

For example, there are available SPS containing a styrenic compound as a component and as a rubbery elastomer (refer to Japanese Patent Application Laid-Open No. 146944/1989), a SPS/rubber composition incorporated with a block or graft copolymer containing atactic polystyrene chain as a compatibilizer (refer to Japanese Patent Application Laid-Open No. 279944/1989), and a SPS/rubber composition incorporated with a poly(phenylene ether) (refer to Japanese Patent Application Laid-Open No. 279944/1989) and the like.

However, since there is used in the above-mentioned improved technique, a rubbery component or a block or graft copolymer containing atactic polystyrene chain as a compatibilizer for the purpose of improving the compatibility between SPS and the rubbery component that are incompatible with each other and enhancing the dispersibility and interfacial strength of the rubbery component, the problem still remains unsolved in that the working effect as the compatibilizer and the enhancement of impact resistance have still been insufficient. On the other hand, in the case of adding a large amount of a poly(phenylene ether) for the purpose of enhancing the impact resistance, the addition thereof inevitably brings about the deterioration of the resultant composition with respect to the hue and long-term. heat resistance as well as the decrease in the crystallinity of the SPS.

DISCLOSURE OF THE INVENTION

In view of the above, intensive research and investigation were continued by the present inventors in order to solve the above-mentioned problems. As a result, it has been found that there is obtained a syndiotactic polystyrene composition which is greatly improved in impact resistance and extensibility without impairing heat resistance or modulus of elasticity by blending, with SPS, a rubbery elastomer having an olefinic component as a rubbery component or a polyolefin and also a styrene/olefin block or graft copolymer having a micro-phase separation temperature of 180° C. at the highest when diluted with dioctyl phthalate to 60% by weight solution. The present invention has been accomplished on the basis of the above-mentioned finding and information.

That is to say, the present invention provides an impact resistant polystyrene composition which comprises 5 to 97% by weight of an (a) styrenic polymer having syndiotactic configuration, 2 to 95% by weight of a (b) rubbery elastomer having an olefinic component or a polyolefin, and 0.5 to 10% by weight of a (c) styrene/olefin block or graft copolymer having a micro-phase separation temperature of 180° C. at the highest when diluted with dioctyl phthalate to a solution with a concentration of 60% by weight; and at the same time an impact resistant polystyrene composition which comprises 5 to 97% by weight of an (a) styrenic polymer having syndiotactic configuration, 2 to 95% by weight of a (b) rubbery elastomer having an olefinic component or a polyolefin, and 0.5 to 10% by weight of a (c) styrene/olefin block or graft copolymer having a micro-phase separation temperature of 180° C. at the highest when diluted with dioctyl phthalate to a solution with a concentration of 60% by weight; and 0.5 to 5% by weight of a (d) poly(phenylene ether).

THE MOST PREFERRED EMBODIMENT TO CARRY OUT THE INVENTION

In the impact resistant polystyrene composition according to the present invention, a styrenic polymer having syndiotactic configuration which constitutes the component (a) is employed as the matrix.

Here, the syndiotactic configuration in the styrenic polymer which has syndiotactic configuration means that its stereochemical structure is of syndiotactic configuration, i.e., the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenated styrene), poly (halogenated alkylstyrene), poly(alkoxystyrene), poly(vinyl benzoate), hydrogenated polymer thereof, the mixture thereof, and copolymers containing the above polymers as main components, having such a syndiotascticity as determined by the above-mentioned method that the proportion of racemic diad is at least 75%, preferably at least 85%, or the proportion of racemic pentad is at least 30%, preferably at least 50%. The poly(alkylstyrene) includes poly (methylstyrene), poly(ethylstyrene), poly(isopropylstyrene), poly(tert-butylstyrene), poly(phenylstyrene), poly (vinylnaphthalene) and poly(vinylstyrene). Poly (halogenated styrene) includes poly(chlorostyrene), poly (bromostyrene), and poly(fluorostyrene). Poly(halogenated alkylstyrene) includes poly(chloromethylstyrene). Poly (alkoxystyrene) includes poly(methoxystyrene), and Poly (ethoxystyrene).

The particularly desirable styrenic polymers are polystyrene, poly(p-methlstyrene), poly(m-methylstyrene), poly(p-tert-butylstyrene), poly(p-chlorostyrene), poly(m-chlorostyrene), poly(p-flurostyrene), hydrogenated polystyrene and the copolymer containing the structural units thereof.

The above-mentioned styrenic polymer may be used alone or in combination with at least one other.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained therefrom is sometimes deteriorated thereby, in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

The rubbery elastomer having an olefinic component or a polyolefin as the component (b) according to the present invention is used for the purpose of improving the impact resistance of the resin composition of the present invention.

Such rubbery elastomer or polyolefin contains, as a monomer unit in its structure, an olefinic component such as ethylene, propylene, butylene, octene, butadiene, isoprene, norbornene, norbornadiene and cyclopentadiene. Specific examples of such rubbery elastomer include natural rubber; polybutadiene; polyisoprene; polyisobutyrene; neoprene; styrene/butadiene block copolymer (SBR); a styrene/butadiene/styrene block copolymer (SBS); hydrogenated styrene/butadiene/styrene block copolymer (SEBS); styrene/isoprene block/styrene block copolymer (SIS); hydrogenated styrene/isoprene block/styrene block copolymer (SEPS); ethylene/propylene rubber (EPM); ethylene/propylene/diene rubber (EPDM); and a rubber formed by modifying any of the foregoing with a modifying agent. Preferable rubbery elastomers among these are SEBS, SBR, SBS, EPM and EPDM.

Specific examples of the polyolefin include isotactic polypropylene, syndiotactic polypropylene, atatic polypropylene, block polypropylene, random polypropylene, high density polyethylene, high pressure processed polyethylene, linear low-density polyethylene, cyclic polyolefin, polybutene, 1,2-polybutadiene and a copolymer of the foregoing.

The above-exemplified rubbery elastomer or polyolefin may be used alone or in combination with at least one other.

The rubbery elastomer or the polyolefin to be used as the component (b) is blended in an amount of 2 to 95%, preferably 5 to 80%, more preferably 10 to 50% by weight based on 100% by weight of the resin composition. A blending amount thereof less than 2% by weight results in little effect on the improvement of impact resistance, whereas that more than 95% by weight unfavorably brings about remarkable deterioration of modulus of elasticity as well as heat resistance of the composition.

The resin composition according to the present invention further comprises, as the component (c), a styrene/olefin block or graft copolymer having a micro-phase separation temperature of 180° C. at the highest when diluted with dioctyl phthalate to a concentration of 60% by weight. It is thought that the above-mentioned copolymer plays a role as a compatibilizing agent between the SPS as the component (a) and the rubbery elastomer as the component (b), and that the lower the micro-phase separation temperature of the styrene/olefin block or graft copolymer, the higher the effect as the compatibilizing agent because of its being prone to be located in the interface of the components (a) and (b) at the time of melt kneading.

The micro-phase separation temperature of the component (c) at the time of being diluted with dioctyl phthalate to a solution with a concentration of 60% by weight is defined as the temperature which simultaneously meets the following requirements ① and ②, and it is thought that a temperature higher than the micro-phase separation temperature results in failure to form a micro-phase separation structure, whereas a temperature lower than that leads to the formation of such a structure.

① When a primary peak-intensity of a small-angle X-ray scattering (Im) is measured as a function of temperature T to plot 1/Im against 1/T, the plot begins to deviate from a straight line just at the micro-phase separation temperature.

② The point at which the primary peak-intensity of a small-angle X-ray scattering appears (qm) begins to shift towards the small-angle side together with temperatures just at the aforesaid temperature.

Specific examples of component (c) include styrene/olefin/styrene block or graft copolymer such as styrene/butadiene block copolymer (SBR), styrene/butadiene/styrene block copolymer (SBS), hydrogenated styrene/butadiene/styrene block copolymer (SEBS), styrene/isoprene block/styrene block copolymer (SIS), hydrogenated styrene/isoprene block/styrene block copolymer (SEPS), and a copolymer formed by modifying any of the foregoing with a modifying agent having a polar group, provided that the micro-phase separation temperature which meets the above-mentioned requirements ① and ② is 180° C. at the highest in any and all of the above-exemplified copolymer. Among these, preferable copolymers are maleic anhydride-modified SEBS, epoxy-modified SEBS, SBR, SBS, and the like.

The above-exemplified styrene/olefin block or graft copolymer may be used alone or in combination with at least one other.

The amount of the component (c) to be added is preferably 0.5 to 10%, more preferably 1 to 5% by weight based on 100% by weight of the resin composition. An amount thereof less than 0.5% by weight results in little effect on the improvement of impact resistance, whereas that more than 10% by weight unfavorably brings about remarkable deterioration of the modulus of elasticity and heat resistance of the resin composition.

In the present invention, in which the impact resistance of SPS is improved without the deterioration of the modulus of elasticity and heat resistance thereof by the simultaneous use of the above-mentioned components (b) and (c), the blending ratio of the component (c) to the component (b) is not specifically limited, but the amount of the component (c) to be added is preferably 1 to 50 parts by weight based on 100 parts by weight of the component (b).

An amount of the component (c) less than 1 part by weight leads to little effect on the improvement of the impact strength and extensibility, whereas that more than 50 parts by weight is unfavorable from the economical point of view. There are preferably used an olefin segment of the components (c) and the olefin-based rubbery elastomer as the component (b) each having the same skeleton or having high compatibility with each other.

The resin composition according to the present invention may further comprise a poly(phenylene ether) as the component (d). The poly(phenylene ether) is a publicly known compound, and reference may be made to U.S. Pat. Nos. 3306874, 3306875, 3257357 and 3257358. The poly(phenylene ether) is prepared usually by oxidative coupling reaction forming a homopolymer or a copolymer in the presence of a cupramine complex and at least one di- or tri-substituted phenol. As the cupramine complex there may be used the cupramine complex derived from any of primary, secondary and tertiary amines.

Specific examples of the suitable poly(phenylene ether) include poly(2,3-dimethyl-6-ethyl-1,4-phenylene ehter), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ehter), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). There is also suitably used a copolymer such as a copolymer derived from at least two phenolic compounds that are used for preparing the above-mentioned homopolymer. Mention is further made for example, of a graft copolymer and a block copolymer each of an aromatic vinyl compound such as styrene and the aforestated poly(phenylene ether). Among the above-mentioned poly(phenylene ether), poly(2,6-dimethyl-1,4-phenylene ether) is particularly desirable for use.

The above-mentioned poly(phenylene ether) may be used alone or in combination with at least one other.

The molecular weight of the component (d) is not particularly limited, but is preferably not less than 0.4 dL (deciliter)/g, more preferably not less than 0.5 dL/g expressed in terms of intrinsic viscosity as measured in chloroform at 25° C. An intrinsic viscosity thereof less than 0.4 dL/g is unfavorably less effective in improving the impact resistance of the composition.

The amount of the component (d) to be added is 0.5 to 5.0%, preferably 1.0 to 5.0% by weight. An amount thereof less than 0.5% by weight unfavorably results in little effect on the improvement of the impact resistance, whereas that more-than 5.0% by weight unfavorably brings about the deterioration of the moldability of the resin composition.

The resin composition according to the present invention may be blended as required, with an inorganic filler as the component (e). As the inorganic filler, mention may be made of various fillers such as fibrous filler, granular filler and powdery filler. Examples of fibrous filler include glass fiber, carbon fiber, whisker, kevlar fiber, ceramics fiber and metallic fiber. Specific examples of the filler include boron; alumina; silica; and silicon carbide as whisker, gypsum; potassium titanate; magnesium sulfate; and magnesium oxide as ceramics fiber, copper; aluminum; and steel as metallic fiber. The form or shape of the filler includes cloth, mat, bound and cut fiber, short fiber, filament and whisker. The bound and cut fiber has preferably a length of 0.05 to 50 mm and a diameter of 5 to 20 μm. The cloth fiber and ma fiber have preferably a length of at least one 1 mm, particularly at least 5 mm.

Examples of granular or powdery filler include talc, carbon black, graphite, titanium dioxide, silica, mica, calcium carbonate, calcium sulfate, barium carbonate, magnesium carbonate, magnesium sulfate, barium sulfate oxysulfate, tin oxide, alumina, kaolin, silicon carbide, metallic powder, glass powder, glass flade and glass bead. Among the above-mentioned fillers are preferable in particular the glass fillers such as glass filament, glass fiber, glass roving, glass mat, glass powder, glass flake and glass beads.

The above-mentioned inorganic filler is preferably surface-treated. The purpose of use of the coupling agent to be used for the surface treatment is to improve the adhesivity between the filler and the resin component. The coupling agent may optionally be selected for use from the publicly known silane-based coupling agent and titanium-based coupling agent. Examples of the silane-based coupling agent include triethoxysilane, vinyltris(β-methoxyethoxy)silane, γ-methacryloxypropyl-trimethoxysilane, γ-glycidoxypropyl-trimethoxysilane, β-(1,1-epoxycyclohexyl)ethyl-trimethoxysilane, n-β-(aminoethyl)-γ-aminopropyl-trimethoxysilane, N-β-(aminoethyl)-γ-aminopropyl-methyldimethoxysilane, γ-aminopropyl-triethoxysilane, N-phenyl-γ-aminopropyl-trimethoxysilane, γ-mercaptopropyl-trimethoxysilane, γ-chloropropyl-trimethoxysilane, γ-aminopropyl-trimethoxysilane, γ-aminopropyl-tris(2-methoxyethoxy)silane, N-methyl-γ-aminopropyl-trimethoxysilane, N-vinylbenzyl-γ-aminopropyl-triethoxysilane, triaminopropyl-trimethoxysilane, 3-ureidopropyl-trimethoxysilane, 3-(4,5-dihydroimidazole)propyl-triethoxysilane, hexamethyldisilazane, N,O-(bistrimethylsilyl)amide and N,N-bis(trimethylsilyl)urea. Among them are desirable aminosilane and epoxysilane such as γ-aminopropyl-triethoxysilane, N-β-(aminoethyl)-γ-aminopropyl-triethoxysilane, γ-glycidoxypropyltrimethoxysilane, β-(3,4-epoxycyclohexyl)ethyltrimethoxysilane.

Specific examples of the titanium-based coupling agent include isopropyltriisostearoyl titanate, isopropyltridodecyl-benzenesulfonyl titanate, isopropyltris(dioctylpyrophosphate) titanate, tetraisopropylbis(dioctylphosphite) titanate, tetraoctylbis(di-tridecylphosphite) titanate, tetra(1,1-diallyloxymethyl-1-butyl)bis(di-tridecyl)phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacrylate titanate, isopropyltri(dioctylphosphate) titanate, isopropyltri-cumylphenyl titanate, isopropyltri(N-amidoethyl-aminoethyl) titanate, dicumylphenyloxyacetate titanate and di-isostearoyl-ethylene titanate, among which isopropyltri(N-amidoethyl-aminoethyl) titanate is desirable.

The surface treatment of the above-mentioned filler by the use of such coupling agent can be effected by a conventional known method without specific limitation, for example, sizing treatment in which the filler is coated with the sizing agent in the form of solution of the coupling agent as mentioned above in an organic solvent or in the form of suspension containing the coupling agent; dry blending by the use of a Henschel mixer, super mixer, Ready-gel mixer, V-type blender or the like; spraying method; integral blending; dry concentration or the like, each being suitably selected according to the form and shape of the filler to be used. The surface treatment is, however, preferably carried out by means of sizing treatment, dry blending, spraying or the like.

In combination with the aforementioned coupling agent, a film-forming substance for glass may be used without specific limitation and is exemplified by the polymer such as polyester-based, polyether-based, urethane-based, epoxy-based, acrylics-based, and vinyl acetate-based polymers.

In the case of blending an inorganic filler in the present composition the blending ratio thereof is set to 0.5 to 350, preferably 5 to 200 parts by weight based on 100 parts by weight of the present resin composition comprising the component (a), the component (b), and the component (c) and optionally, the component (d). A blending ratio thereof less than 0.5 part by weight results in that the blending effect of the filler is not sufficiently recognized, whereas that more than 350 parts by weight brings about such disadvantages as poor dispersibility of the filler and difficulty in the molding of the present composition.

The resin composition of the present invention may be blended, when necessary as the component (f) with a polymer having compatibility with or affinity for the above-described component (a) and further containing a polar group. Such a polymer is imparted with the function of enhancing the adhesivity of the inorganic filler onto the resin.

Here, the polymer having compatibility with or affinity for the component (a) and further containing a polar group is a polymer which contains in its chain, a chain exhibiting compatibility with or affinity for the component (a), and is exemplified by a polymer containing syndiotactic polystyrene, atactic polystyrene, isotactic polystyrene, styrenic polymer, poly(phenylene ether), poly(vinyl ethyl ether) or the like as its main chain, block chain or graft chain.

The polar group as mentioned above need only be a polar group which enhances the adhesivity to the above-mentioned inorganic filler and specifically exemplified by a group of any of acid anhydride, carboxylic acid, carboxylic acid ester, carboxylic acid halide, carboxylic acid amide, carboxylate, sulfonic acid, sulfonic acid ester, sulfonic acid chloride, sulfonic acid amide and sulfonate, epoxy group, amino group, imide group and oxazoline group.

Specific examples of the component (f) include styrene/maleic anhydride copolymer(SMA), styrene/glycidyl methacrylate copolymer, carboxylic acid end-modified polystyrene, epoxy group end-modified polystyrene, oxazoline end-modified polystyrene, amine end-modified polystyrene, sulfonated polystyrene, styrenic ionomer, styrene/methyl methacrylate graft copolymer, (styrene/glycidyl methacrylate)/methyl methacrylate graft copolymer, acid modified acrylate/styrene graft copolymer, (styrene/glycidyl methacrylate)/styrene graft copolymer, polybutylene terephthalate/polystyrene graft copolymer, modified styrenic polymer such as maleic anhydride modified SPS, fumaric acid modified SPS, glycidyl methacrylate modified SPS and amine-modified SPS, and modified polyphenylene ether such as (styrene/maleic anhydride)/poly(phenylene ether) graft copolymer, maleic anhydride modified poly(phenylene ether), fumaric acid modified poly(phenylene ether), glycidyl methacrylate modified poly(phenylene ether) and amine modified poly(phenylene ether).

Of these, modified SPS and modified poly(phenylene ether) are particularly preferable.

The above-mentioned polymer may be used alone or in combination with at least one other.

The aforesaid modified styrenic polymer and modified poly(phenylene ether) can be produced by modifying any of various styrenic polymers and poly(phenylene ether) by the use of a modifying agent. However, the production process is not limited to this process insofar as the modified product is usable for the object of the present invention.

In the case of preparing modified SPS, the polymer as exemplified as the component (a) may be used as the starting SPS without specific limitation. There is preferably used however, a styrene/substituted styrene copolymer from the standpoint of compatibility with the SPS as the component (a). The constitution of the copolymer is not specifically limited, but the proportion of the substituted styrene is preferably 1 to 50 mol %. A proportion thereof less than 1 mol % causes difficulty in modification, whereas that more than 50 mol % results in unfavorable deterioration of compatibility with SPS.

Examples of particularly preferably comonomer include alkylstyrenes such as methylstyrene, ethylstyrene, isopropylstyrene, tert-butylstyrene and vinylstyrene; halogenated styrenes such as chlorostyrene, bromostyrene and fluorostyrene; halogenated alkylstyrenes such as chloromethylstyrene; and alkoxystyrenes such as methoxystyrene and ethoxystyrene.

Polymers having atactic configuration can be used provided that the amount thereof to be used is not more than 5% by weight based on the component (a). An amount thereof more than 5% by weight unfavorably causes deterioration of the heat resistance of the resin composition.

As the modifying agent used for modifying the poly (phenylene ether) or SPS, there is used a compound having an ethylenic double bond and a polar group in the same molecule, which is specifically exemplified by maleic anhydride, maleic acid, maleic acid ester, maleimide, N-substituted compound thereof, maleic acid derivatives typified by maleic acid salt, fumaric acid, fumaric acid ester, fumaric acid derivatives typified by fumaric acid salt, itaconic acid, itaconic acid ester, itaconic acid derivatives typified by itaconic acid salt, acrylic acid, acrylic acid ester, acrylic acid amide, acrylic acid derivatives typified by acrylic acid salt, methacrylic acid, methacrylic acid ester, methacrylic acid amide, methacrylic acid salt and methacrylic acid derivatives typified by glycidyl methacrylate, among which are preferably used maleic anhydride, fumaric acid, and glycidyl methacrylate in particular.

The modified SPS is obtained, for example, by reacting the above-mentioned starting SPS with a modifying agent in the presence of a solvent or an other resin. There are available publicly known methods such as a method wherein the SPS and the modifying agent are melt kneaded at a temperature in the range of 150° to 300° C. to proceed with reaction by the use of a roll mill, Banbury mixer, extruder or the like, and a method in which the aforesaid components are reacted with heating in a solvent such as benzene, toluene, xylene or the like. In order to readily proceed with the reaction, it is effective to allow a radical generating agent to be present in the reaction-system which is exemplified by benzoyl peroxide, di-tert-butyl peroxide, dicumyl peroxide, tert-butyl peroxybenzoate, azobis(isobutyronitrile), azobis (isovaleronitrile) and 2,3-diphenyl-2,3-dimethylbutane. A preferable method is a method by melt kneading in the presence of a radical generating agent. Moreover, an other resin may be added at the time of modifying. Among these modified SPS, there are particularly preferably used maleic acid anhydride-modified SPS and fumaric acid-modified SPS.

The modified poly(phenylene ether) is obtained in the same manner as the modified SPS by the use of poly (phenylene ether) as the starting material, for which those described as the component (d) can be used. As an example, any of the poly(phenylene ether) described as the component (d) can be modified by using the aforesaid modifying agent by the process exactly the same as the process for the modified SPS. Among the modified poly(phenylene ether), there are particularly preferably used maleic anhydride-modified poly(phenylene ether) and fumaric acid-modified poly(phenylene ether).

The content of the polar group in the polymer as the component (f) which has compatibility with or affinity for the component (a) and further contains a polar group is preferably in the range of 0.01 to 20% by weight, more preferably 0.05 to 10% by weight based on the polymer. A content thereof less than 0.01% by weight brings about the necessity for adding a large amount of the polymer in order to exert the effect on the adhesion to the inorganic filler, thereby unfavorably deteriorating the dynamical properties, heat resistance and moldability of the resulting composition, whereas that more than 20% by weight causes unfavorable deterioration of the compatibility with the component (a).

The blending ratio of the component (f) is in the range of preferably 0.1 to 10, more preferably 0.5 to 8 parts by weight based on 100 parts by weight of the present resin composition comprising the component (a), the component (b), and the component (c), and optionally, the component (d). A blending ratio thereof less than 0.1 part by weight results in little effect on adhesivity to the inorganic filler and insufficient adhesivity between the resin and the inorganic filler, whereas that more than 10 parts by weight unfavorably causes deterioration of the crystallizability of the component (a) as well as remarkable deterioration of the heat resistance and moldability of the resultant composition.

The composition according to the present invention may be incorporated as necessary with an additive such as a nucleating agent, an antioxidant, a ultraviolet absorber, an external lubricant, a plasticizer, an antistatic agent, a colorant, a flame retardant and a flame retardant aid or another thermoplastic resin insofar as the object of the present invention is not impaired thereby.

The nucleating agent can be arbitrarily selected for use from among the publicly known species that are exemplified by a metallic salt of a carboxylic acid such as aluminum di-p-tert-butylbenzoate, a metallic salt of phosphoric acid such as sodium phosphate of methylenebis(2,4-di-tert-butylphenol)acid, talc, phthalocyanine derivatives and the like. The nucleating agent may be used alone or in combination with at least one other.

The plasticizer can be arbitrarily selected for use from among the publicly known species that are exemplified by polyethylene glycol, polyamide oligomer, ethylenebisstearamide, phthalic acid ester, polystyrene oligomer, polyethylene wax, mineral oil, silicone oil, and the like. The plasticizer may be used alone or in combination with at least one other.

The flame retardant and flame retardant aid can be arbitrarily selected from among the publicly known species that are exemplified by brominated polystyrene, brominated syndiotactic polystyrene, brominated poly(phenylene ether), etc. as flame retardant, and antimony compounds such as antimony trioxide, etc. as flame retardant aid. Any of then may be used alone or in combination with at least one other.

Examples of the usable antioxidant include (2,6-di-tert-butyl-4-methylphenyl) pentaerythritol diphosphate (produced by Adeka Argus Co., Ltd. under the trademark "PEP-36") and tetrakis|methylene-3-(3',5'-di-tert-butyl-4'-hydroxyphenyl)] propionate (produced by Adeka Argus Co., Ltd. under the trademark "MARK A060").

The antioxidant may be used alone or in combination with at least one other.

Each of the compositions according to the present invention is prepared by compounding and blending the aforesaid indispensable components and any one of the additive components to be used when desired.

As a method of blending, there may be optionally adoptable melt kneading method, solution blending method and the like method, each being a conventional known method. As a method of blending the inorganic filler which has been treated with the coupling agent, there may be adoptable, in addition to the aforesaid methods, a method in which a sheet composed of the component (a) or a composition containing the same is laminated with glass mat, followed by melting, a method in which the component (a) or a composition containing the same and a long fiber type inorganic filler are mixed in a liquid to form a slurry, followed by precipitation and heating and the like method. In general, ordinary melt kneading by means of a Banbury mixer, Henschel mixer, kneading roll or the like is preferable.

In the following, the present invention will be described in more detail with reference to preparation examples, examples and comparative examples.

PREPARATION EXAMPLE 1

In a 2 L (liter) reaction vessel were placed 1.0 L of purified styrene, 1 mmol of triethylaluminum, and after heating to 80° C., 16.5 mL of a premixed catalyst comprising 90 µmol of pentamethylcyclopentadienyltitanium trimethoxide, 90 µmol of dimethylaliniumtetra (pentafluorophenyl) borate, 29.1 mmol of toluene and 1.8 mmol of triisobutylaluminum, which were then subjected to polymerization reaction at 80° C. for 5 hours.

After the completion of the reaction, the reaction product was washed with methanol repeatedly and dried to afford 380 g of polymer. As the result of analysis by gel permeation chromatography using 1,2,4-trichlorobenzene at 130° C. as the solvent, the polymer thus produced had a weight-average molecular weight of 320,000 and a ratio of weight-average molecular weight to number-average molecular weight of 2.60.

It was confirmed that the polymer was polystyrene having syndiotactic configuration(SPS) from the results of melting point measurement and $^{13}$C-NMR analysis using carbon isotope.

PREPARATION EXAMPLE 2

In a 2 L reaction vessel were placed 0.9 L of purified styrene, 0.1 L of P-methylstyrene, 1 mmol of triethylaluminum, and after heating to 80° C., 16.5 ml of a premixed catalyst comprising 90 µ mol of pentamethylcyclopentadienyltitanium trimethoxide, 90 µ mol of dimethylalininiumtetra(pentafluorohenyl)borate, 29.1 mmol of toluene and 1.8 mmol of triisobutylaluminum, which were then subjected to polymerization reaction at 80° C. for 5 hours.

After the completion of the reaction, the reaction product was washed with methanol repeatedly and dried to afford 390 g of polymer. As the result of analysis by gel permeation chromatography using 1,2,4-trichlorobenzene at 130° C. as the solvent, the polymer thus produced had a weight-average molecular weight of 328,000 and a ratio of weight-average molecular weight to number-average molecular weight of 2.60.

It was confirmed that the polymer was polystyrene having syndiotactic configuration (SPS) and p-methylstyrene unit content of 12 mol % from the results of melting point measurement and $^{13}$C-NMR analysis using carbon isotope.

PREPARATION EXAMPLE 3

One (1) kg of styrene/p-methylstyrene copolymer (p-methylstyrene unit content of 12 mol %) produced in Preparation Example 2, 30 g of maleic anhydride, and 10 g of 2,3-dimethyl-2,3-diphenylbutane (produced by Nippon Oil & Fat Co., Ltd. under the trade name "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride modified SPS. One g of the resultant modified SPS was dissolved in ethylbenzene and then reprecipitated from methanol, and the recovered polymer was subjected to Soxhlet extraction and dried. Thereafter, the modification efficiency was determined from the intensity of carbonyl absorption in infrared (IR) absorption spectrum and titration. As a result, the modification efficiency was 1.05% by weight.

PREPARATION EXAMPLE 4

One (1) kg of poly(phenylene ether) (intrinsic viscosity of 0.45 dL/g in chloroform at 25° C.), 60g of maleic anhydride, and 10 g of 2,3-dimehtyl-2,3-diphenylbutane (produced by Nippon Oil & Fat Co., Ltd. under the trade name "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified poly(phenylene ether). One (1) g of the resultant modified poly(phenylene ether) was dissolved in ethylbenzene and then reprecipitated in methanol, and the recovered polymer was subjected to Soxhlet extraction and dried. Thereafter, the modification efficiency was determined from the intensity of carbonyl absorption in infrared (IR) absorption spectrum and titration. As a result, the modification efficiency was 2.0% by weight.

REFERENCE EXAMPLE 1

Details of the component (c) and measurement of the micro-phase separation temperature.
(1) Preparation of sample A sample in an amount of 0.84 g was dissolved in a mixed solvent of 0.56 g of dioctyl phthalate and 15 mL of toluene. The resultant solution was cast onto a glass plate, allowed to stand for one week to evaporate away the toluene and further dried at room temperature under reduced pressure for 2 hours to prepare samples in the form of film.
(2) Measurement of small angle X-ray scattering The samples were irradiated with X-ray having 50 kV output and 200 mA, and the scattering intensity was detected with a position-sensitive proportional counter. The scattered ray was corrected for absorption on the samples, scattering by air and incoherent scattering.

The samples were heated at 240° C. for 5 minutes to dissolve micro-phase separation structure, cooled to lower the temperature stepwise at 10° C. intervals as low as 100° C. to measure small angle X-ray scattering.
(3) Determination of micro-phase separation temperature There were obtained a primary peak-intensity of a small angle X-ray scattering at each temperature (Im) and the point at which the aforesaid peak-intensity appeared (qm).

The qm and the reciprocal of Im thus obtained were plotted against the reciprocal of absolute temperature, and the temperature which simultaneously meets the following requirements ① and ② was defined as the micro-phase separation temperature. ① The qm begins to shift towards the decreasing region together with temperature from the region where the qm keeps a constant value independently of temperatures. ② The plot for the reciprocal of Im against the reciprocal of T begins to deviate from a straight line.

The following shows the kinds of samples used and the results of micro-phase separation temperature obtained from the small-angle X-ray scattering.

C1: maleic anhydride-modified SEBS (MA-g-SEBS) having a micro-phase separation temperature of 170° C., produced by Asahi Chemical Industry Co., Ltd. under the trade name "M-1911"

C2: maleic anhydride-modified SEBS (MA-g-SEBS) having a micro-phase separation temperature of 130° C., produced by Asahi Chemical Industry Co., Ltd. under the trade name "M-1913"

C3: SBS having a micro-phase separation temperature of 50° C., produced by shell chem. Co. under the trade name "Kraton D-1102"

C4: SEBS having a micro-phase separation temperature of 190° C., produced by Asahi Chemical Industry Co., Ltd. under the trade name "Toughtechs H-1041".

C5: SEBS having a micro-phase separation temperature of 190° C., produced by Shell Chem. Co. under the trade name "Kraton G-1652"

EXAMPLE 1

To 100 parts by weight of the mixture comprising 80% by weight of SPS which had been produced in Preparation Example 1 (weight-average molecular weight of 320,000, weight-average molecular weight Mw/number-average molecular weight Mn of 2.60) as the component (a), 16% by weight of SEBS (produced by Shell Chem. Co. under the tradename "Kraton G-1651") as the component (b) and 4% by weight of (c1) as the component (c) were added 0.1 part by weight of (2,6-di-tert-butyl-4-methylphenyl) pentaerythritol diphosphite (produced by Adeka Argus Co., Ltd. under the trade name "PEP-36") as an antioxidant and 0.1 part by weight of tetrakis [ methylene-3-(3',5'-di-tert-butyl-4'-hydroxyphenyl) ] propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 1.

EXAMPLES 2 to 6

The procedure in Example 1 was repeated except that there were used the components (b) and (c) as shown in Table 1. The results are given in Table 1.

EXAMPLE 7

To 100 parts by weight of the mixture comprising 76% by weight of SPS which had been produced in Preparation Example 1 (weight-average molecular weight of 320,000 weight-average molecular weight Mw/number-average molecular weight Mn of 2.60) as the component (a), 16% by weight of SEBS as the component (b) (produced by Shell Chem. Co. under the trade name "Kraton G-1651"), 4% by weight of (c1) as the component (c) and 4% by weight of poly(2,6-dimethyl-1,4-phenylene ether) (|η|=0.55 dL/g in chloroform at 25° C.) as the component (d) were added 0.1 part by weight of (2,6-di-tert-butyl-4-methylphenyl) pentaerythritol diphosphite (produced by Adeka Argus Co., Ltd. under the trade name "PEP-36") as an antioxidant and 0.1 part by weight of tetrakis |methylene-3-(3',5'-di-tert-butyl-4'-hydroxyphenyl)| propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 1.

EXAMPLES 8 to 13

The procedure in Example 7 was repeated except that there were used the components (b), (c) and (d) as shown in Table 1. The results are given in Table 1.

ponent (b). In addition, the use of the component (d) in combination with the components (a), (b) and (c) enables the resin composition to be further improved in impact strength and elongation.

The physical properties of the resin composition were measured by the following methods.

Izod impact strength : according to JIS K-7110 tensile elongation : according to JIS K-7113

Flexural modulus of elasticity : according to JIS K-7208

Heat distortion temperature : according to JIS K-7207

The origins of the rubbery elastomers and polyolefin that were used as the component (b) are as follows.

SEBS; produced by Shell Chem. Co. trade name; G1661

EPM; produced by Japan Synthetic Rubber Co., Ltd.; EP07P

EPDM; produced by Japan Synthetic Rubber Co., Ltd.; EP57P

PP; Idemitsu Petrochemical Co., Ltd.; E100G

TABLE 1

| | Constitution | | | | | | | Physical properties | | | |
|---|---|---|---|---|---|---|---|---|---|---|---|
| | Component (a) | Component (b) | | Component (c) | | Component (d) | | Izod impact strength | Tensile | Flexural modulus of | Heat distortion |
| Example | % by weight | kind | % by weight | kind | % by weight | |η| dl/g | % by weight | with notch kJ/m² | elongation % | elasticity MPa | temperature °C. |
| Example 1 | 80 | SEBS | 16 | c1 | 4 | — | 0 | 8.5 | 15.0 | 2320 | 119 |
| Example 2 | 80 | SEBS | 16 | c2 | 4 | — | 0 | 9.3 | 17.1 | 2350 | 117 |
| Example 3 | 80 | EPM | 16 | c2 | 4 | — | 0 | 5.0 | 10.8 | 2350 | 126 |
| Example 4 | 80 | EPDM | 16 | c2 | 4 | — | 0 | 6.1 | 11.2 | 2370 | 124 |
| Example 5 | 80 | PP | 16 | c2 | 4 | — | 0 | 5.0 | 9.8 | 2580 | 131 |
| Example 6 | 80 | SEBS | 16 | c3 | 4 | — | 0 | 10.4 | 19.3 | 2300 | 120 |
| Example 7 | 76 | SEBS | 16 | c1 | 4 | 0.55 | 4 | 20.1 | 20.0 | 2300 | 121 |
| Example 8 | 76 | SEBS | 16 | c2 | 4 | 0.55 | 4 | 30.5 | 28.1 | 2310 | 122 |
| Example 9 | 76 | SEBS | 16 | c2 | 4 | 0.45 | 4 | 25.5 | 23.5 | 2320 | 120 |
| Example 10 | 76 | EPM | 16 | c2 | 4 | 0.55 | 4 | 6.8 | 12.3 | 2360 | 123 |
| Example 11 | 76 | EPDM | 16 | c2 | 4 | 0.55 | 4 | 7.5 | 14.5 | 2350 | 120 |
| Example 12 | 76 | PP | 16 | c2 | 4 | 0.55 | 4 | 6.5 | 11.5 | 2560 | 132 |
| Example 13 | 76 | SEBS | 16 | c3 | 4 | 0.55 | 4 | 29.8 | 26.8 | 2290 | 122 |

As is clear from the results given in Table 1, by the simultaneous use of the rubbery elastomer as the component (b) and the component (c), it is made possible to remarkably improve the impact strength and elongation of the resin composition in comparison with the single use of the com-

COMPARATIVE EXAMPLES 1 to 12

The procedure in Example 1 was repeated except that there were used the components (b) and (c) as shown in Table 2. The results are given in Table 2.

TABLE 2

| | Constitution | | | | | | | Physical properties | | | |
|---|---|---|---|---|---|---|---|---|---|---|---|
| | Component (a) | Component (b) | | Component (c) | | Component (d) | | Izod impact strength | Tensile | Flexural modulus of | Heat distortion |
| Comparative Example | % by weight | kind | % by weight | kind | % by weight | |η| dl/g | % by weight | with notch kJ/m² | elongation % | elasticity MPa | temperature °C. |
| Comparative Example 1 | 80 | SEBS | 20 | — | 0 | — | 0 | 6.0 | 10.0 | 2350 | 120 |
| Comparative Example 2 | 80 | SEBS | 16 | c4 | 4 | — | 0 | 6.1 | 10.0 | 2310 | 120 |
| Comparative Example 3 | 80 | SEBS | 16 | c5 | 4 | — | 0 | 5.8 | 9.0 | 2340 | 118 |

TABLE 2-continued

| | Constitution | | | | | | | Physical properties | | | |
|---|---|---|---|---|---|---|---|---|---|---|---|
| | Component (a) | Component (b) | | Component (c) | | Component (d) | | Izod impact strength | Tensile | Flexural modulus of | Heat distortion |
| Comparative Example | % by weight | kind | % by weight | kind | % by weight | [η] dl/g | % by weight | with notch kJ/m² | elongation % | elasticity MPa | temperature °C. |
| Comparative Example 4 | 80 | EPM | 20 | — | 0 | — | 0 | 2.1 | 5.0 | 2400 | 128 |
| Comparative Example 5 | 80 | EPM | 16 | c4 | 4 | — | 0 | 2.5 | 6.0 | 2380 | 121 |
| Comparative Example 6 | 80 | EPM | 16 | c5 | 4 | — | 0 | 2.3 | 6.0 | 2410 | 122 |
| Comparative Example 7 | 80 | EPDM | 20 | — | 0 | — | 0 | 2.8 | 7.1 | 2390 | 122 |
| Comparative Example 8 | 80 | EPDM | 16 | c4 | 4 | — | 0 | 8.0 | 7.3 | 2400 | 123 |
| Comparative Example 9 | 80 | EPDM | 16 | c5 | 4 | — | 0 | 3.0 | 7.3 | 2380 | 122 |
| Comparative Example 10 | 80 | PP | 20 | — | 0 | — | 0 | 2.5 | 4.7 | 2520 | 130 |
| Comparative Example 11 | 80 | PP | 16 | c4 | 4 | — | 0 | 2.7 | 5.1 | 2500 | 131 |
| Comparative Example 12 | 80 | PP | 16 | c5 | 4 | — | 0 | 2.8 | 5.0 | 2500 | 132 |

EXAMPLE 14

To 100 parts by weight of the mixture comprising 80% by weight of SPS which had been produced in Preparation Example 1 (weight-average molecular weight of 320,000, weight-average molecular weight Mw/number-average molecular weight Mn of 2.60) as the component (a), 16% by weight of SEBS as the component (b) (produced by Shell Chem. Co. under the trade name "Kraton G-1651"), and 4% by weight of (c1) as the component (c) were added 0.1 part by weight of (2,6-di-tert-butyl-4-methylphenyl) pentaerythritol diphosphite (produced by Adeka Argus Co., Ltd. under the trade name "PEP-36") as an antioxidant and 0.1 part by weight of tetrakis [methylene-3-(3,5'-di-tert-butyl-4'-hydroxyphenyl)] propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder, while it was incorporated with 43 parts by weight of glass fiber (10 μm/3 mm, produced by Asahi Fiber Glass Co., Ltd. under the trade name "FT-712") by side feeding as the component (e). The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 3.

EXAMPLE 15 to 19 and Comparative Examples 13 to 24

The procedure in Example 14 was repeated except that there were used the components (b) and (c) as shown in Table 3. The results are given in Table 3.

TABLE 3

| | Constitution | | | | | | Physical properties | | | |
|---|---|---|---|---|---|---|---|---|---|---|
| Example and Comparative Example | Component (a) | Component (b) | | Component (c) | | Component (e) (FT-712) | Izod impact strength | Tensile | Flexural modulus of | Heat distortion |
| | % by weight | kind | % by weight | kind | % by weight | Parts by weight | with notch kJ/m² | elongation % | elasticity MPa | temperature °C. |
| Example 14 | 80 | SEBS | 16 | c1 | 4 | 43 | 6.2 | 1.8 | 8350 | 225 |
| Example 15 | 80 | SEBS | 16 | c2 | 4 | 43 | 6.5 | 1.9 | 8300 | 225 |
| Example 16 | 80 | EPM | 16 | c2 | 4 | 43 | 5.5 | 1.6 | 8250 | 220 |
| Example 17 | 80 | EPDM | 16 | c2 | 4 | 43 | 5.7 | 1.7 | 8300 | 221 |
| Example 18 | 80 | PP | 16 | c2 | 4 | 43 | 5.5 | 1.7 | 8500 | 230 |
| Example 19 | 80 | SEBS | 16 | c3 | 4 | 43 | 6.8 | 1.9 | 8250 | 227 |
| Comparative Example 13 | 80 | SEBS | 20 | — | 0 | 43 | 4.7 | 1.5 | 8300 | 225 |
| Comparative Example 14 | 80 | SEBS | 16 | c4 | 4 | 43 | 5.0 | 1.6 | 8250 | 223 |
| Comparative Example 15 | 80 | SEBS | 16 | c5 | 4 | 43 | 5.1 | 1.5 | 8250 | 225 |
| Comparative | 80 | EPM | 20 | — | 0 | 43 | 4.5 | 1.4 | 8200 | 223 |

TABLE 3-continued

| Example and Comparative Example | Constitution ||||| Physical properties ||||
|---|---|---|---|---|---|---|---|---|---|
| | Component (a) | Component (b) || Component (c) || Component (e) (FT-712) | Izod impact strength | Tensile | Flexural modulus of | Heat distortion |
| | % by weight | kind | % by weight | kind | % by weight | Parts by weight | with notch kJ/m² | elongation % | elasticity MPa | temperature °C. |
| Example 16 Comparative Example 17 | 80 | EPM | 16 | c4 | 4 | 43 | 4.8 | 1.4 | 8300 | 220 |
| Comparative Example 18 | 80 | EPM | 16 | c5 | 4 | 43 | 4.8 | 1.5 | 8300 | 220 |
| Comparative Example 19 | 80 | EPDM | 20 | — | 0 | 43 | 4.6 | 1.5 | 8250 | 220 |
| Comparative Example 20 | 80 | EPDM | 16 | c4 | 4 | 43 | 4.9 | 1.4 | 8200 | 219 |
| Comparative Example 21 | 80 | EPEM | 16 | c5 | 4 | 43 | 4.7 | 1.5 | 8300 | 224 |
| Comparative Example 22 | 80 | PP | 20 | — | 0 | 43 | 4.6 | 1.4 | 8450 | 229 |
| Comparative Example 23 | 80 | PP | 16 | c4 | 4 | 43 | 4.5 | 1.5 | 8450 | 230 |
| Comparative Example 24 | 80 | PP | 16 | c5 | 4 | 43 | 4.6 | 1.5 | 8500 | 230 |

EXAMPLE 20

To 100 parts by weight of the mixture comprising 76% by weight of SPS which had been produced in Preparation Example 1 (weight-average molecular weight of 320,000, weight-average molecular weight Mw/number-average molecular weight Mn of 2.60) as the component (a), 16% by weight of SEBS as the component (b) (produced by Shell Chem. Co. under the trade name "Kraton G-1651"), 4% by weight of (cl) as the component (c) and 4% by weight of poly(2,6-dimethyl-1,4-phenylene ether) ($|\eta|$=0.55 dL/g in chloroform at 25°C.) as the component (d) were added 0.1 part by weight of (2,6-di-tert-butyl-4-methylphenyl) pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder, while it was incorporated with 43 parts by weight of glass fiber (10 μm/3 mm, produced by Asahi Fiber Glass Co., Ltd. under the trade name "FT-712") by side feeding as the component (e). The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLES 21 to 26

The procedure in Example 20 was repeated except that there were used the components (b), (c) and (d) as shown in Table 4. The results are given in Table 4.

EXAMPLE 27

To 100 parts by weight of the mixture comprising 80% by weight of SPS which had been prepared in Preparation Example 1 (weight-average molecular weight of 320,000, weight-average molecular weight Mw/number-average molecular weight Mn of 2.60) as the component (a), 16% by weight of SEBS as the component (b) (produced by Shell Chem. Co. under the trade name "Kraton G-1651"), and 4% by weight of (cl) as the component (c) were added 3 parts by weight of maleic anhydride-modified SPS as the component (f) which had been prepared in Preparation Example 3, 0.1 part by weight of (2,6-di-tert-butyl-4-methylphenyl) pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder, while it was incorporated with 43 parts by weight of glass fiber (10 μm/3 mm, produced by Asahi Fiber Glass Co., Ltd. under the trade name "FT-712") by side feeding as the component (e). The pellet thus obtained was injection molded to produce test pieces for tensile test, flexural test and Izod. impact test, respectively. Measurements were made of Izod impact strength, elongation, modulus of elasticity and heat distortion temperature of the test pieces thus obtained. The results are given in Table 4.

EXAMPLES 28 to 34

To 100 parts by weight of the mixture comprising 76% by weight of SPS which had been produced in Preparation Example 1 (weight-average molecular weight of 320,000, weight-average molecular weight Mw/number-average molecular weight Mn of 2.60) as the component (a), 16% by weight of SEBS as the component (b) (produced by Shell Chem. Co. under the trade name "Kraton G-1651"), 4% by weight of (cl) as the component (c) and 4% by weight of poly(2,6-dimethyl-1,4-phenylene ether) ($|\eta|$ 0.55 dL/g in chloroform at 25° C.) as the component (d) were added 3 parts by weight of maleic anhydride-modified SPS as the component (f) which had been prepared in Preparation Example 3, 0.1 part by weight of (2,6-di-tert-butyl-4-methylphenyl)pentaerythritol diphosphite (produced by Adeka Argus Co., Ltd. under the trade name "PEP-36") as an antioxidant and 0.1 part by weight of tetrakis-[ methylene-3-(3',5'-di-tert-butyl-4'-hydroxyphenyl)] propionate (produced by Adeka Argus Co., Ltd. under the trade name "MARK A060") also as an antioxidant, and the resultant mixture was dry-blended with a Henschel mixer. Subsequently the blend was melt kneaded and pelletized with a twin-screw extruder, while it was incorporated with 43 parts by weight of glass fiber (10 m/3 mm, produced by Asahi Fiber Glass Co., Ltd. under the trade name "FT-712") by side feeding as the component (e). The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLES 36 to 42

The procedure in Example 35 was repeated except that there were used the components (b), (c) and (d) as shown in Table 4. The results are given in Table 4.

TABLE 4

| | Constitution | | | | |
|---|---|---|---|---|---|
| | Component (a) | Component (b) | | Component (c) | |
| Example | % by weight | kind | % by weight | kind | % by weight |
| Example 20 | 76 | SEBS | 16 | c1 | 4 |
| Example 21 | 76 | SEBS | 16 | c2 | 4 |
| Example 22 | 76 | SEBS | 16 | c2 | 4 |
| Example 23 | 76 | EPD | 16 | c2 | 4 |
| Example 24 | 76 | EPDM | 16 | c2 | 4 |
| Example 25 | 76 | PP | 16 | c2 | 4 |
| Example 26 | 76 | SEBS | 16 | c3 | 4 |
| Example 27 | 80 | SEBS | 16 | c2 | 4 |
| Example 28 | 80 | EPM | 16 | c2 | 4 |
| Example 29 | 80 | EPDM | 16 | c2 | 4 |
| Example 30 | 80 | PP | 16 | c2 | 4 |
| Example 31 | 80 | SEBS | 16 | c2 | 4 |
| Example 32 | 80 | EPM | 16 | c2 | 4 |
| Example 33 | 80 | EPDM | 16 | c2 | 4 |
| Example 34 | 80 | PP | 16 | c2 | 4 |
| Example 35 | 76 | SEBS | 16 | c2 | 4 |
| Example 36 | 76 | EPM | 16 | c2 | 4 |
| Example 37 | 76 | EPDM | 16 | c2 | 4 |
| Example 38 | 76 | PP | 16 | c2 | 4 |
| Example 39 | 76 | SEBS | 16 | c2 | 4 |
| Example 40 | 76 | EPM | 16 | c2 | 4 |
| Example 41 | 76 | EPDM | 16 | c2 | 4 |
| Example 42 | 76 | PP | 16 | c2 | 4 |

| | Constitution | | | |
|---|---|---|---|---|
| | Component (d) | | Component (e) | Component (f) | |
| Example | $[\eta]$ dl/g | % by weightmd | (FT-712) parts | kind | parts by weight |
| Example 20 | 0.55 | 4 | — | — | |
| Example 21 | 0.55 | 4 | — | — | |
| Example 22 | 0.45 | 4 | — | — | |
| Example 23 | 0.55 | 4 | — | — | |
| Example 24 | 0.55 | 4 | — | — | |
| Example 25 | 0.55 | 4 | — | — | |
| Example 26 | 0.55 | 4 | — | — | |
| Example 27 | — | 0 | 43 | preparation Example 3 | 3 |
| Example 28 | — | 0 | 43 | preparation Example 3 | 3 |
| Example 29 | — | 0 | 43 | preparation Example 3 | 3 |
| Example 30 | — | 0 | 43 | preparation Example 3 | 3 |
| Example 31 | — | 0 | 43 | preparation Example 4 | 3 |
| Example 32 | — | 0 | 43 | preparation Example 4 | 3 |
| Example 33 | — | 0 | 43 | preparation Example 4 | 3 |
| Example 34 | — | 0 | 43 | preparation Example 4 | 3 |
| Example 35 | 0.55 | 4 | 43 | preparation Example 3 | 3 |
| Example 36 | 0.55 | 4 | 43 | preparation Example 3 | 3 |
| Example 37 | 0.55 | 4 | 43 | preparation Example 3 | 3 |
| Example 38 | 0.55 | 4 | 43 | preparation Example 3 | 3 |
| Example 39 | 0.55 | 4 | 43 | preparation Example 4 | 3 |
| Example 40 | 0.55 | 4 | 43 | preparation Example 4 | 3 |
| Example 41 | 0.55 | 4 | 43 | preparation Example 4 | 3 |
| Example 42 | 0.55 | 4 | 43 | preparation Example 4 | 3 |

| | Physical properties | | | |
|---|---|---|---|---|
| Example | Izod impact strength with notch kJ/m$^2$ | Tensile elongation % | Flexural modulus of elasticity MPa | Heat distortion temperature °C. |
| Example 20 | 7.0 | 2.0 | 8250 | 224 |
| Example 21 | 7.5 | 2.1 | 8300 | 223 |
| Example 22 | 7.0 | 2.0 | 8250 | 225 |
| Example 23 | 6.2 | 1.8 | 8200 | 224 |
| Example 24 | 6.5 | 1.8 | 8350 | 222 |
| Example 25 | 6.2 | 1.8 | 8550 | 229 |
| Example 26 | 7.7 | 2.0 | 8300 | 225 |
| Example 27 | 9.1 | 2.0 | 8450 | 240 |
| Example 28 | 8.0 | 1.9 | 8400 | 238 |
| Example 29 | 8.3 | 1.9 | 8450 | 239 |
| Example 30 | 8.0 | 1.9 | 8500 | 242 |
| Example 31 | 9.8 | 2.1 | 8500 | 242 |
| Example 32 | 8.3 | 2.0 | 8450 | 240 |
| Example 33 | 8.7 | 2.0 | 8450 | 239 |
| Example 34 | 8.4 | 1.9 | 8550 | 243 |
| Example 35 | 10.1 | 2.2 | 8500 | 241 |
| Example 36 | 9.2 | 2.1 | 8450 | 240 |
| Example 37 | 9.2 | 2.1 | 8500 | 241 |
| Example 38 | 9.2 | 1.9 | 8600 | 243 |
| Example 39 | 10.9 | 2.3 | 8550 | 243 |
| Example 40 | 9.6 | 2.1 | 8500 | 241 |
| Example 41 | 9.5 | 2.2 | 8450 | 243 |
| Example 42 | 9.4 | 2.0 | 8600 | 244 |

As is clear from the results given in Tables 3 and 4, by the simultaneous use of the rubbery elastomer as the component (b) and the component (c), it is made possible to remarkably improve the impact strength and elongation of the resin composition in comparison with the single use of the component (b). In addition, the use of the component (d) in combination with the components (a), (b) and (c) enables the resin composition to be further improved in impact strength and elongation.

INDUSTRIAL APPLICABILITY

As described hereinbefore, the impact resistant polystyrene composition according to the present invention is enhanced in heat resistance, modulus of elasticity and moldability and is excellent in extensibility as well as impact resistance and can provide molded products imparted with excellent physical properties, irrespective of the molding method applied thereto. Accordingly, the impact resistant polystyrene composition is expected to find effective use for the production of various moldings by injection molding, sheets, films, etc. by extrusion molding, containers, trays, etc. by extrusion molding and thermoforming, uniaxially or biaxially oriented films, sheets, etc. by extrusion molding and orientation, fibrous moldings by spinning method and the like molded products.

We claim:

1. An impact resistant polystyrene composition which comprises:

5 to 97% by weight of an (a) styrenic polymer having syndiotactic configuration;

2 to 95% by weight of (b) at least one rubber selected from the group consisting of polyolefin, natural rubber, modified natural rubber, polybutadiene, polyisoprene, neoprene, hydrogenated styrene/butadiene/styrene block copolymer (SEBS), styrene/isoprene styrene block copolymer (SIS), hydrogenated styrene/isoprene/ styrene block copolymer (SEPS), ethylene/propylene rubber (EPM), ethylene/propylene/diene rubber (EPDM), modified polybutadiene, modified polyisoprene, modified neoprene, modified SIS, modified SEPS, modified EPM, modified EPDM; and 0.5 to 10% by weight of (c) at least one rubber selected from the group consisting of maleic anhydride-modified SEBS, epoxy-modified SEBS, styrene/butadiene block copolymer (SBR) and styrene/butadiene/styrene block copolymer (SBS), said component (c) having a micro-phase separation temperature of 180° C. at the highest when diluted with dioctyl phthalate to a solution with a concentration of 60% by weight.

2. An impact resistant polystyrene composition which comprises 100 parts by weight of a resin composition comprising:

5 to 97% by weight of an (a) styrenic polymer having syndiotactic configuration;

2 to 95% by weight of (b) at least one rubber selected from the group consisting of polyolefin, natural rubber, modified natural rubber, polybutadiene, polyisoprene, neoprene, hydrogenated styrene/butadiene/styrene block copolymer (SEBS), styrene/isoprene styrene block copolymer (SIS), hydrogenated styrene/isoprene/ styrene block copolymer (SEPS), ethylene/propylene rubber (EPM), ethylene/propylene/diene rubber (EPDM), modified polybutadiene, modified polyisoprene, modified neoprene, modified SIS, modified SEPS, modified EPM, modified EPDM; and 0.5 to 10% by weight of (c) at least one rubber selected from the group consisting of maleic anhydride-modified SEBS, epoxy-modified SEBS, styrene/butadiene block copolymer (SBR) and styrene/butadiene/styrene block copolymer (SBS), said component (c) having a micro-phase separation temperature of 180° C. at the highest when diluted with dioctyl phthalate to a solution with a concentration of 60% by weight; and 0.5 to 350 parts by weight of an (e) inorganic filler.

3. The impact resistant polystyrene composition according to claim 1 wherein the component (c) is present in an amount of 1 to 50 parts by weight per 100 parts by weight of the component (b).

* * * * *